June 12, 1928.

W. HESS 1,673,331

PROTECTIVE ARRANGEMENT FOR HIGH TENSION ELECTRICAL APPARATUS

Filed Jan. 11, 1924

Inventor:
W. Hess.
By Langner, Parry, Card + Langner
Attys.

Patented June 12, 1928.

1,673,331

UNITED STATES PATENT OFFICE.

WILHELM HESS, OF BASEL, SWITZERLAND, ASSIGNOR TO EMIL HAEFELY & CO. A. G., OF BASEL, SWITZERLAND.

PROTECTIVE ARRANGEMENT FOR HIGH-TENSION ELECTRICAL APPARATUS.

Application filed January 11, 1924, Serial No. 685,714, and in Switzerland January 22, 1923.

This invention relates to high tension electrical apparatus and has for its object to provide improved arrangements for protecting apparatus of this character from the abnormal electrical stresses imposed thereon and particularly upon the leading-in turns of the windings when the apparatus is first connected in circuit by the operation of a controlling switch for instance.

It has already been proposed to render the action of peaked waves or high frequency oscillations upon such apparatus harmless, either by capacitive protection with condensers between the high voltage terminal and earth or merely by a capacitive bridging over the leading-in turns of the winding by means of suitable condensers connected between the terminals of the coils or coil groups.

It is found that such a protection is particularly effective when the amount of the capacity and the number of the capacitive subdivisions are as great as possible, as for example, when the greatest possible number of coils or groups of coils of the winding is protected by means of capacity.

A more recent suggestion is in the case of coil windings to provide the individual layers of the winding coils with an intermediate metallic layer and thus increase the capacity of the coil. This suggestion, which is good in itself, is somewhat difficult of realization, inasmuch as the individual metallic layers must be led out of the coil and moreover the manufacture is expensive and somewhat uncertain.

According to another solution, which as a matter of fact aims at a favorable disposition of the field of the coil, the inner and outer surfaces of the winding coils are protected by metallic shields, but this constructional arrangement also causes considerable difficulties.

The present invention relates to protective arrangements of the condenser type for high tension windings in which these difficulties are obviated by providing individual coils or all the coils of the winding with an outer, electrically conducting covering surrounding the coil, and connected to the incoming lead of the coil, but separated from the out-going lead by means of a gap of insulation.

It is preferable to construct this coil covering which to a certain extent constitutes a condenser plate, in the form of a conducting band wound around the coil.

In this case it is advantageous that the coil covering should be limited to a greater or smaller extent of the length of the coil, which varies from coil to coil, so as to be in accordance with the different proper capacity of the various coils relative to the iron mass of the apparatus.

The drawing illustrates a constructional example of the subject matter of the invention, in so far as this is necessary for a clear understanding of the invention.

Figure 1:
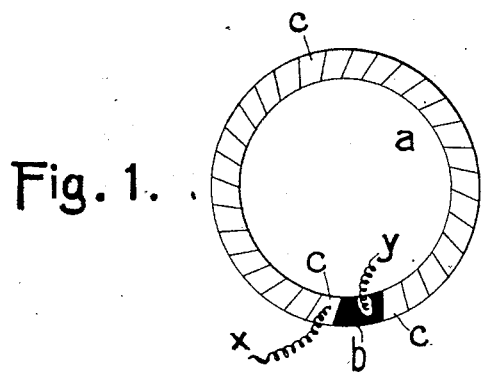
Figure 1 illustrates in plan view a coil winding provided with the protectiv arrangements as applied, for example, to a transformer high tension winding.
Figure 2:
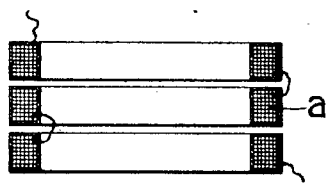
Figure 2 is a partial vertical section.
Figure 3:
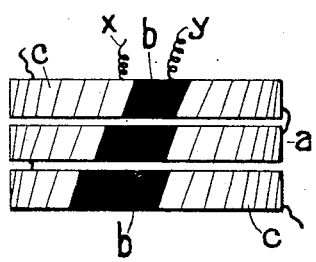
Figure 3 is a side view thereof.
Figure 4:
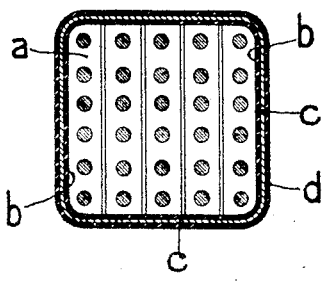
Figure 4 is a partial cross-section on an enlarged scale of part of one of the coils.

The coils $a$ which in the usual manner are provided with a layer of insulating material $b$, are surrounded by a conducting covering $c$ which encloses the coil round about and according to Figures 1 and 3 is constituted by a thin conducting or metallic band wound round the coil. This covering $c$ does not extend over the entire length of the coil. It is conductively connected to the ingoing lead $x$ of the coil, but is separated from the outgoing lead $y$ by a gap or strip of insulating material. The covering $c$ is in turn protected with insulation $d$. The thickness of the covering $c$ may be selected at will, but experiments have shown that even the thickness of metal foil is sufficient; also the covering could be formed in accordance with the Schoop spraying process, so as to provide a metallic layer. The outer conductive covering $c$ serves to the purpose of increasing the capacity of the single turns of the coils owing to the fact that, while in a normal coil without covering this inner capacity is given by the capacity between the single turns, the covering $c$ provides for an additional metallic layer connected to one end of the coil, against which the other turns of the coil develop additional capacities, the load current of which increases from turn to turn towards the other end of the coil.

In Figures 1 and 3 the insulation gap provided between the two ends of the covering $c$ is shown in black, as it will be seen from Figure 3. This insulating path in the successive coils connected in series is of different lengths. Under these conditions, in the upper coil, for instance, the metallic covering $c$ extends over a greater peripheral length of coil, in the lower ones over a smaller length of coil, whereby the additional capacities between the single turns of a coil and the end winding, respectively the metallic layer $c$ connected thereto may be influenced as desired. If, for instance, a surge wave enters the secondary winding, the increased capacities of the single turns of a coil against this outer surface will tend to flatten the amplitude of this wave and by graduating additional capacities of the following coils through the different lengths of the metallic layers, there can be obtained a uniform decrease of the value of the amplitude of the surge wave until the normal tension is arrived at.

In order to prevent discharges at the extreme edges of the covering where the coil lead $y$ is located the neighboring edges or ends of the covering may be protected by means of a suitably conducting varnish or a metal oxide layer, or, in fact, any badly conducting protecting layer, so that an effective shielding of the edge field is secured.

What I claim is:

1. A protective arrangement of the condenser type of multiple coiled high tension windings, in which the series connected coils of the winding are each provided with an outer electrically conducting covering surrounding the coil round about and limited to different peripheric lengths within the various coils, said covering being connected to one coil connection lead, but separated from the other coil connection lead by means of an insulating portion having different peripheric length within the various coils.

2. A protective arrangement of the condenser type for multiple coiled high tension windings, in which the series connected coils of the winding are each provided with an outer electrically conducting covering surrounding the coil round about, said covering being connected to one coil connection lead, but separated from the other coil connection lead by means of an insulating portion of different peripheric length within the various coils, the ends of said covering being covered with a suitable protecting layer, so as to secure an effective shielding of the edge field.

In witness whereof I have hereunto signed my name this 27th day of December, 1923.

WILHELM HESS.